(12) United States Patent
Byadgi et al.

(10) Patent No.: US 12,317,373 B2
(45) Date of Patent: *May 27, 2025

(54) METHOD AND APPARATUS FOR IDENTIFYING IN-CALL CAPABILITY FEATURES

(71) Applicant: Samsung Electronics Co., Ltd., Suwon-si (KR)

(72) Inventors: Chandrashekhar Byadgi, Bangalore (IN); Vijetha Bhyrappa, Bangalore (IN); Akhil Goel, Bangalore (IN); Ashish Anand, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/349,824

(22) Filed: Jul. 10, 2023

(65) Prior Publication Data

US 2023/0354011 A1 Nov. 2, 2023

Related U.S. Application Data

(63) Continuation of application No. 17/251,173, filed as application No. PCT/KR2019/007079 on Jun. 12, 2019, now Pat. No. 11,700,526.

(30) Foreign Application Priority Data

Jun. 12, 2018 (IN) .............................. 201841021986
Jun. 10, 2019 (IN) .............................. 201841021986

(51) Int. Cl.
*H04W 8/24* (2009.01)
*H04L 65/1069* (2022.01)
(Continued)

(52) U.S. Cl.
CPC ........... *H04W 8/24* (2013.01); *H04L 65/1069* (2013.01); *H04L 65/1073* (2013.01);
(Continued)

(58) Field of Classification Search
None
See application file for complete search history.

(56) References Cited

U.S. PATENT DOCUMENTS 8,059,656 B1 * 11/2011 Telikepalli ............ H04L 47/765
370/428
8,111,686 B2 * 2/2012 Chavda ............... H04L 12/2898
709/227

(Continued)

FOREIGN PATENT DOCUMENTS

CN 104427560 A 3/2015
EP 2922316 B1 5/2017
(Continued)

OTHER PUBLICATIONS

Rosenberg et al., SIP: Session Initiation Protocol, Jun. 2002, RFC 3261 (Year: 2002).*

(Continued)

*Primary Examiner* — Backhean Tiv

(57) ABSTRACT

A method and apparatus are provided for identifying In-Call capability features. The method includes sending, by a Mobile Originated(MO), a call request message to a Mobile Terminated(MT), wherein the call request message comprises information regarding In-Call capability features of the MO; receiving, by the MO, a call response message from the MT, wherein the call response message comprises information regarding In-Call capability features of the MT; and performing, by the MO, In-Call capability negotiation with the MT.

16 Claims, 5 Drawing Sheets

(51) Int. Cl.
*H04L 65/1073* (2022.01)
*H04L 65/1083* (2022.01)
*H04L 65/1096* (2022.01)
*H04L 65/1104* (2022.01)
*H04L 69/24* (2022.01)

(52) U.S. Cl.
CPC ...... *H04L 65/1083* (2013.01); *H04L 65/1096* (2013.01); *H04L 65/1104* (2022.05); *H04L 69/24* (2013.01)

(56) References Cited

U.S. PATENT DOCUMENTS

| | | | | |
|---|---|---|---|---|
| 8,180,870 B1* | 5/2012 | McDysan | H04L 41/0893 | 370/235 |
| 8,208,931 B2* | 6/2012 | Gupta | H04M 7/1225 | 455/445 |
| 8,472,453 B2* | 6/2013 | Bangalore | H04L 65/104 | 370/467 |
| 8,582,566 B2* | 11/2013 | Bae | H04L 65/1069 | 370/352 |
| 8,817,607 B2* | 8/2014 | Song | H04L 65/1016 | 370/912 |
| 9,025,553 B2* | 5/2015 | Stille | H04L 65/1016 | 370/352 |
| 9,160,799 B2* | 10/2015 | Toshniwal | H04L 65/1069 | |
| 9,426,250 B2* | 8/2016 | Rasanen | H04L 65/1104 | |
| 9,491,203 B2* | 11/2016 | Noldus | H04L 65/1069 | |
| 9,930,088 B1* | 3/2018 | Hodge | H04L 65/1069 | |
| 10,044,769 B2* | 8/2018 | Mufti | H04L 65/1046 | |
| 10,044,777 B2* | 8/2018 | Beaufils | H04L 65/1069 | |
| 10,237,726 B2* | 3/2019 | Zhu | H04L 69/24 | |
| 11,076,076 B2* | 7/2021 | Oh | H04L 67/306 | |
| 11,178,191 B2* | 11/2021 | Manjunath | H04L 65/1069 | |
| 11,290,501 B2* | 3/2022 | Atarius | H04L 65/1016 | |
| 11,700,526 B2* | 7/2023 | Byadgi | H04L 69/24 | 709/227 |
| 2004/0047437 A1* | 3/2004 | Hamiti | H04W 28/18 | 375/326 |
| 2004/0139088 A1* | 7/2004 | Mandato | H04L 9/40 | |
| 2004/0196867 A1* | 10/2004 | Ejzak | H04M 3/56 | 709/227 |
| 2004/0205192 A1* | 10/2004 | Olson | H04L 65/1104 | 709/227 |
| 2005/0041578 A1* | 2/2005 | Huotari | H04L 9/40 | 370/229 |
| 2006/0153102 A1* | 7/2006 | Kuure | H04W 4/10 | 370/263 |
| 2007/0041528 A1* | 2/2007 | Menon | H04L 65/1043 | 379/90.01 |
| 2007/0076854 A1* | 4/2007 | Liu | H04L 65/1089 | 379/202.01 |
| 2007/0218924 A1* | 9/2007 | Burman | H04L 65/1104 | 455/466 |
| 2007/0294411 A1* | 12/2007 | Hakkarainen | H04L 65/1069 | 709/227 |
| 2008/0049725 A1* | 2/2008 | Rasanen | H04L 65/1104 | 370/352 |
| 2008/0133675 A1* | 6/2008 | Ramanathan | H04L 51/04 | 709/206 |
| 2008/0144637 A1* | 6/2008 | Sylvain | H04W 36/00226 | 370/401 |
| 2008/0165787 A1* | 7/2008 | Xu | H04L 12/56 | 370/395.2 |
| 2008/0170563 A1* | 7/2008 | Zhu | H04L 65/1104 | 370/352 |
| 2008/0259909 A1* | 10/2008 | Runeson | H04L 65/1104 | 370/352 |
| 2008/0270553 A1* | 10/2008 | Mu | H04L 51/04 | 709/206 |
| 2008/0304438 A1* | 12/2008 | Stille | H04M 3/54 | 370/328 |
| 2009/0010247 A1* | 1/2009 | Stille | H04L 65/1101 | 370/352 |
| 2009/0055473 A1* | 2/2009 | Synnergren | H04L 65/1101 | 709/204 |
| 2009/0122789 A1* | 5/2009 | Seong | H04L 12/66 | 370/352 |
| 2009/0168758 A1* | 7/2009 | Apelqvist | H04L 65/104 | 370/352 |
| 2009/0213826 A1* | 8/2009 | Wang | H04L 65/1104 | 455/466 |
| 2010/0002849 A1* | 1/2010 | Wang | H04L 69/24 | 379/87 |
| 2010/0118778 A1* | 5/2010 | Ranke | H04L 65/1043 | 348/14.02 |
| 2010/0134590 A1* | 6/2010 | Lindstrom | H04L 65/1016 | 370/352 |
| 2010/0205313 A1* | 8/2010 | Boire-Lavigne | H04L 65/1069 | 709/228 |
| 2010/0268826 A1* | 10/2010 | Dahl | H04L 12/14 | 709/227 |
| 2010/0312832 A1* | 12/2010 | Allen | H04L 65/1104 | 709/204 |
| 2010/0329244 A1* | 12/2010 | Buckley | H04L 65/1016 | 370/352 |
| 2011/0103373 A1* | 5/2011 | Shatsky | H04L 65/1016 | 370/352 |
| 2011/0150203 A1* | 6/2011 | Stille | H04L 65/1096 | 379/207.16 |
| 2011/0225307 A1* | 9/2011 | George | H04L 69/10 | 709/227 |
| 2011/0249650 A1* | 10/2011 | Seppanen | H04W 76/16 | 370/328 |
| 2011/0289201 A1* | 11/2011 | Lochbaum | H04L 65/1094 | 709/227 |
| 2012/0021751 A1* | 1/2012 | Zhang | H04M 3/42 | 455/445 |
| 2012/0219130 A1* | 8/2012 | Zhu | H04L 65/1069 | 379/93.01 |
| 2013/0275615 A1* | 10/2013 | Oyman | H04L 65/75 | 709/231 |
| 2014/0155048 A1* | 6/2014 | Zawaideh | H04W 8/22 | 455/418 |
| 2014/0269624 A1* | 9/2014 | Khay-Ibbat | H04W 36/302 | 370/332 |
| 2014/0324952 A1* | 10/2014 | Irwin | H04L 65/1016 | 709/203 |
| 2015/0055653 A1 | 2/2015 | Suryavanshi | | |
| 2015/0066641 A1* | 3/2015 | Dudley | G06Q 30/0271 | 705/14.51 |
| 2015/0131652 A1* | 5/2015 | Telikepalli | H04L 47/722 | 370/352 |
| 2015/0140981 A1* | 5/2015 | Balasaygun | H04L 65/1069 | 455/418 |
| 2015/0215159 A1* | 7/2015 | Liao | H04L 65/75 | 370/225 |
| 2015/0223054 A1* | 8/2015 | Zhu | H04L 69/24 | 370/328 |
| 2015/0334241 A1* | 11/2015 | Noldus | H04M 3/533 | 455/413 |
| 2016/0105468 A1* | 4/2016 | Mufti | H04L 65/80 | 709/228 |
| 2016/0119384 A1* | 4/2016 | Karimli | H04L 43/08 | 370/252 |
| 2016/0227447 A1* | 8/2016 | Hu | H04W 36/00224 | |
| 2016/0241683 A1* | 8/2016 | Ye | H04L 65/1069 | |
| 2016/0366190 A1* | 12/2016 | Xiao | H04L 65/1069 | |
| 2017/0125021 A1* | 5/2017 | Garre | H04W 72/543 | |
| 2017/0180432 A1* | 6/2017 | Gjärdman | H04M 3/42008 | |
| 2017/0339539 A1* | 11/2017 | Guo | H04L 65/1016 | |
| 2018/0077001 A1* | 3/2018 | Noldus | H04L 65/103 | |
| 2018/0132141 A1* | 5/2018 | Huang-Fu | H04L 65/1016 | |
| 2018/0176266 A1* | 6/2018 | Filart | H04L 65/80 | |
| 2018/0183736 A1* | 6/2018 | Stafford | H04L 67/54 | |
| 2018/0317165 A1* | 11/2018 | Krishnamoorthy | H04W 52/0219 | |
| 2018/0352092 A1* | 12/2018 | Rajendran | H04W 36/0094 | |

(56) References Cited

U.S. PATENT DOCUMENTS

| | | | |
|---|---|---|---|
| 2019/0045335 A1* | 2/2019 | Jin | H04W 88/02 |
| 2019/0045578 A1* | 2/2019 | Oyman | H04L 65/1104 |
| 2021/0219131 A1* | 7/2021 | Byadgi | H04L 65/1073 |
| 2023/0354011 A1* | 11/2023 | Byadgi | H04L 69/24 |

FOREIGN PATENT DOCUMENTS

| | | | |
|---|---|---|---|
| JP | 6099825 | B2 | 3/2017 |
| KR | 101718550 | B1 | 3/2017 |
| WO | 2014003465 | A1 | 1/2014 |
| WO | 2017135787 | A1 | 8/2017 |

OTHER PUBLICATIONS

Notification of Transmittal of the International Search Report and the Written Opinion of the International Searching Authority, or the Declaration dated Sep. 24, 2019 in connection with International Patent Application No. PCT/KR2019/007079, 11 pages.

Supplementary European Search Report dated Jul. 8, 2021 in connection with European Application No. 19819353.4, 9 pages.

Communication pursuant to Article 94(3) EPC dated Aug. 30, 2022, in connection with European Application No. 19819353.4, 6 pages.

Communication pursuant to Article 94(3) EPC dated May 5, 2023, in connection with European Application No. 19819353.4, 6 pages.

Communication pursuant to Article 94(3) EPC dated Dec. 11, 2023, in connection with European Patent Application No. 19819353.4, 7 pages.

Communication pursuant to Article 94(3) EPC dated May 14, 2024, in connection with European Patent Application No. 19819353.4, 6 pages.

Notice of Allowance dated Oct. 23, 2024, in connection with European Patent Application No. 19819353.4, 38 pages.

Office Action issued Jan. 28, 2021, in connection with Indian Patent Application No. 201841021986, 6 pages.

\* cited by examiner

METHOD AND APPARATUS FOR IDENTIFYING IN-CALL CAPABILITY FEATURES

CROSS-REFERENCE TO RELATED APPLICATIONS

This application is a continuation of application Ser. No. 17/251,173 filed Dec. 10, 2020, now U.S. Pat. No. 11,700,526 issued Jul. 11, 2023, which is a 371 of International Application No. PCT/KR2019/007079 filed on Jun. 12, 2019, which claims priority to India Patent Application No. 201841021986 filed on Jun. 12, 2018, and India Patent Application No. 201841021986 filed on Jun. 10, 2019, the disclosures of which are herein incorporated by reference in their entirety.

BACKGROUND

1. Field

The disclosure relates to mobile communication, and more specifically to a method and apparatus for identifying In-Call capability features.

2. Description of Related Art

Conventionally, a Mobile Originated (MO) has to negotiate with a Mobile Terminated (MT) after establishing a call between the MO and the MT, to know In-Call capability features of the MT such as a shared sketch, a shared map etc.

Due to various timing issue in signalling the In-Call capability features of the MO and the MT after establishing the call, the MO and the MT do not properly display the call and the In-Call capabilities to the user. In case of a communication between the MO and the MT in a slow network, the SIP messages may be jumbled up. Therefore, the MO and the MT receives the SIP messages totally in a non-sequential manner, which further leads the MO and the MT to operate in an un-predictable manner. Therefore, signalling of a large amount of SIP messages for every call session is unfavourable for identifying the In-Call capability features of the MO and the MT. Moreover, signalling of the large amount of SIP messages consumes network traffic in large amount.

In case of a SUBSCRIBE, PUBLISH, AND NOTIFY capability exchange network, the In-Call capability features are not defined by Mobile Communications Association (GSMA). However, communicating the In-Call capability features of the MO and the MT is desirable in the SUBSCRIBE, PUBLISH, AND NOTIFY capability exchange network.

In hybrid networks, the MO supports a PRESENCE way of capability discovery and the MT supports OPTIONS way of capability discovery and vice versa. Conventional methods does not define steps for handling the signalling messages in the hybrid networks for capability discovery of the MO and the MT due to complexity in using the PRESENCE way and the OPTIONS way together for the capability discovery.

Thus, it is desired to address the above mentioned shortcomings or at least provide a useful alternative.

SUMMARY

The embodiments herein is to provide a method and apparatus for identifying In-Call capability features without dedicated capability discovery procedure.

The embodiments provide an efficient method for identifying In-Call capability features in a communication system.

BRIEF DESCRIPTION OF THE DRAWINGS

This method and apparatus is illustrated in the accompanying drawings, throughout which like reference letters indicate corresponding parts in the various figures. The embodiments herein will be better understood from the following description with reference to the drawings, in which.

DETAILED DESCRIPTION

Figure 1A:
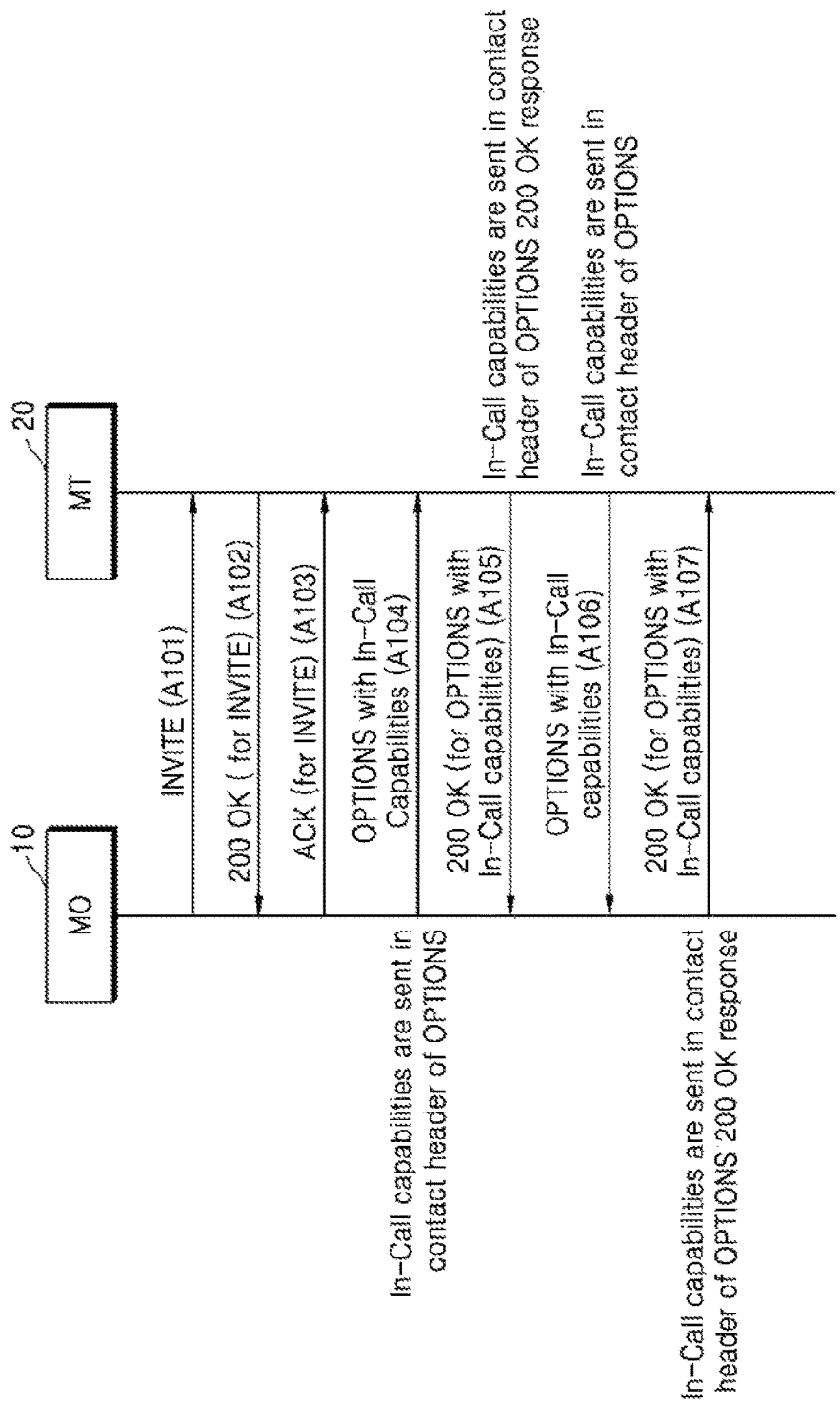
FIG. 1A is a sequential diagram illustrating signalling of SIP messages between a MO and a MT to identify In-Call capability features by performing dedicated capability discovery procedure.

Accordingly the embodiments herein provide a method for identifying In-Call capability features without dedicated capability discovery procedure. The method may include sending, by a Mobile Originated(MO), a call request message to a Mobile Terminated(MT), wherein the call request message comprises information regarding In-Call capability features of the MO; receiving, by the MO, a call response message from the MT, wherein the call response message comprises information regarding In-Call capability features of the MT; and performing, by the MO, In-Call capability negotiation with the MT.

In an embodiment, the call request message may be a Session Initiation Protocol (SIP) INVITE message and the call response message may be a SIP INVITE 200 OK message.

In an embodiment, the information regarding In-Call capability features of the MO may be included in a contact header of the call request message when the MO supports a Voice Over Long Term Evolution(VOLTE) and a Rich Communication Service(RCS) on a single Packet Data Network(PDN) and the MT supports the VOLTE and the RCS on a single PDN.

In an embodiment, the information regarding In-Call capability features of the MO may be included in a SIP private extension header of the call request message when one of: a. The MO supports a VOLTE and a RCS on a single PDN, and the MT supports the VOLTE on a first PDN and the RCS on a second PDN, b. The MO supports the VOLTE on the first PDN and the RCS on the second PDN, and the MT supports the VOLTE and the RCS on the single PDN, and c. The MO supports the VOLTE on the first PDN and the RCS on the second PDN, and the MT supports the VOLTE on the first PDN and the RCS on the second PDN.

In an embodiment, the method may be performed in a SUBSCRIBE, PUBLISH, AND NOTIFY network, a network that supports OPTIONS way of capability exchange or a hybrid network.

Accordingly the embodiments herein provide a method for identifying In-Call capability features without dedicated capability discovery procedure. The method may include receiving, by a Mobile Terminated(MT), a call request message from a Mobile Originated(MO), wherein the call request message comprises information regarding In-Call capability features of the MO; sending, by the MT, a call response message comprising information regarding In-Call capability features of the MT to the MO, when the MT is a Voice Over Long Term Evolution (VOLTE) device, or performing, by the MT, a legacy capability exchange for exchanging the information regarding In-Call capability features of the MT, when the MT is a non-VOLTE device.

In an embodiment, wherein sending of, by the MT, the call response message comprises: determining, by the MT, whether the information regarding In-Call capability features of the MO is included in a contact header of the call request message; determining, by the MT, whether the information regarding In-Call capability features of the MO is included in a SIP private extension header of the call request message, in response to determining that the information regarding In-Call capability features of the MO is not included in the contact header of the call request message; and sending, by the MT, the call response message comprising the information regarding In-Call capability features of the MT to the MO.

In an embodiment, the call request message may be a Session Initiation Protocol (SIP) INVITE message and the call response message is a SIP INVITE 200 OK message.

In an embodiment, the information regarding In-Call capability features of the MO may be included in the contact header of the call request message when the MO supports a VOLTE and a Rich Communication Service (RCS) on a single Packet Data Network (PDN) and the MT supports the VOLTE and the RCS on a single PDN.

In an embodiment, wherein the information regarding In-Call capability features may be included in the SIP private extension header of the call request message when one of: a. The MO supports a VOLTE and a RCS on a single PDN, and the MT supports the VOLTE on a first PDN and the RCS on a second PDN, b. The MO supports the VOLTE on the first PDN and the RCS on the second PDN, and the MT supports the VOLTE and the RCS on the single PDN, and c. The MO supports the VOLTE on the first PDN and the RCS on the second PDN, and the MT supports the VOLTE on the first PDN and the RCS on the second PDN.

In an embodiment, the method may be performed in a SUBSCRIBE, PUBLISH, AND NOTIFY network, a network that supports OPTIONS way of capability exchange or a hybrid network.

Accordingly the embodiments herein provide a MO for identifying In-Call capability features without dedicated capability discovery procedure. The MO may include a memory; and a processor, coupled to the memory, configured to: send a call request message to a Mobile Terminated (MT), wherein the call request message comprises information regarding In-Call capability features of the MO; receive a call response message from the MT, wherein the call response message comprises information regarding In-Call capability features of the MT; and perform In-Call capability negotiation with the MT.

In an embodiment, the call request message may be a Session Initiation Protocol (SIP) INVITE message and the call response message is a SIP INVITE 200 OK message.

In an embodiment, the information regarding In-Call capability features of the MO may be included in a contact header of the call request message when the MO supports a Voice Over Long Term Evolution(VOLTE) and a Rich Communication Service(RCS) on a single Packet Data Network (PDN) and the MT supports the VOLTE and the RCS on a single PDN.

Accordingly the embodiments herein provide a MT for identifying In-Call capability features without dedicated capability discovery procedure. The MT may include a memory; and a processor, coupled to the memory, configured to: receive a call request message from a Mobile Originated(MO), wherein the call request message comprises information regarding In-Call capability features of the MO; send a call response message comprises information regarding In-Call capability features of the MT, when the MT is a Voice Over Long Term Evolution (VOLTE) device or perform a legacy capability exchange for exchanging the information regarding In-Call capability features of the MT, when the MT is a non-VOLTE device.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The embodiments herein provide a method for identifying In-Call capability features without dedicated capability discovery procedure. The method includes sending, by a MO(Mobile Originated), a call request message to a MT(Mobile Terminated). Further, the call request message includes the In-Call capability features of the MO. Further, the method includes receiving, by the MO, a call response message from the MT. Further, the call response message includes the In-Call capability features of the MT. Further, the method includes performing, by the MO, In-Call capability negotiation with the MT.

Unlike exiting methods and systems, the proposed method can be used to exchange the In-Call capability features between the MO and the MT within less number of signaling messages. Therefore, a jumbling up of SIP(Session Initiation Protocol) messages in a slow network can be avoid by employing the proposed method in the slow network, due to exchanging reduced number of signaling messages.

Based on the proposed method, the MO and the MT exchanges the In-Call capability features while establishing a call. Therefore, a timing issue in signalling the In-Call capability features of the MO and the MT after establishing the call in the existing system can be solved by employing the proposed method.

An established call between the MO and the MT can hold and resume by sending less number of signaling messages between the MO and the MT based on the proposed method. Therefore, the MO and the MT consumes only a less amount of network traffic for exchanging the In-Call capability features, holding and resuming the call etc., while comparing to the existing methods and systems. The proposed method also have a flexibility to employ in a SUBSCRIBE, PUBLISH, AND NOTIFY capability exchange network, a network that supports OPTIONS way of capability exchange as well as in hybrid networks for exchanging the In-Call capability features of the MO and the MT.

That is, the MO and the MT in a SUBSCRIBE, PUBLISH, AND NOTIFY capability exchange network, in a network that supports OPTIONS way of capability exchange or in a hybrid network performs an proposed method of the disclosure. In other words, the proposed method disclosed herein may be performed in a SUBSCRIBE, PUBLISH, AND NOTIFY network, a network that supports OPTIONS way of capability exchange or a hybrid network.

Furthermore the identification of the In-Call capability features without dedicated capability discovery procedure is used in a SUBSCRIBE, PUBLISH, AND NOTIFY network, a network that supports OPTIONS way of capability exchange and a hybrid network, according to the present disclosure.

Furthermore, the In-Call capability features are identifying without performing a dedicated capability discovery procedure, according to the present disclosure.

According to the present disclosure, In-Call capability features may be information regarding In-Call capability features. Furthermore, the information regarding In-Call capability may include information regarding whether the MO or the MT is capable of sharing content (such as map, sketch, presentation, chat, location, video, audio, files or group of files), but not limited thereon. Furthermore, In-Call capability features may includes Pre-call capability and Post-call capability.

Referring now to the drawings, and more particularly to FIGS. 1A through 6, there are shown preferred embodiments.

A MO 10 and a MO 100 are similar devices which operate as a mobile originated, whereas the MO 100 may include novel hardware elements which describe in the embodiments of the disclosure. A MT 20 and a MT 200 are similar devices which operate as a mobile terminated, whereas the MT 200 may include novel hardware elements which describe in the embodiments of the disclosure.

The MO 10, MO 100, MT 20, and MT 200 can be, for example, but not limited to a cellular phone, a smart phone, a Personal Digital Assistant (PDA), a tablet computer, a laptop computer, a smart social robot, a smart watch, a music player, a video player, an Internet of things (IoT) device or the like.

FIG. 1A is a sequential diagram illustrating signalling of Session Initiation Protocol (SIP) messages between the MO 10 and the MT 20 to identify the In-Call capability features by performing OPTIONS way of capability discovery.

In operation A101, the MO 10 may send a call request message (i.e. INVITE message) to the MT 20 for connecting to the MT 20. In operation A102, the MT 20 may send a call response message (i.e. 200 OK message), in response to connecting to the MO 10.

In operation A103, the MO 10 may send an acknowledgment to the MT 20, in response to receiving the call response message. In operation A104, the MO 10 may send OPTIONS message to the MT 20 for indicating the In-Call capability features of the MO 10 to the MT 20, where a contact header of the OPTIONS message may include the In-Call capability features of the MO 10.

In operation A105, the MT 20 may acknowledge with the 200 OK message to the MO 10, in response to receiving the OPTIONS message from the MO 10. In operation A106, the MT 20 may send OPTIONS message to the MO 10 for indicating the In-Call capability features of the MT 20 to the MO 10, where the contact header of the OPTIONS message may include the In-Call capability features of the MT 20.

In operation A107, the MO 10 may acknowledge with the 200 OK message to the MT 20, in response to receiving the OPTIONS message from the MT 20. Therefore, at least two OPTIONS messages are consumed for each connected call, to know the In-Call capability features of the MO 10 and the MT 20.

Figure 1B:
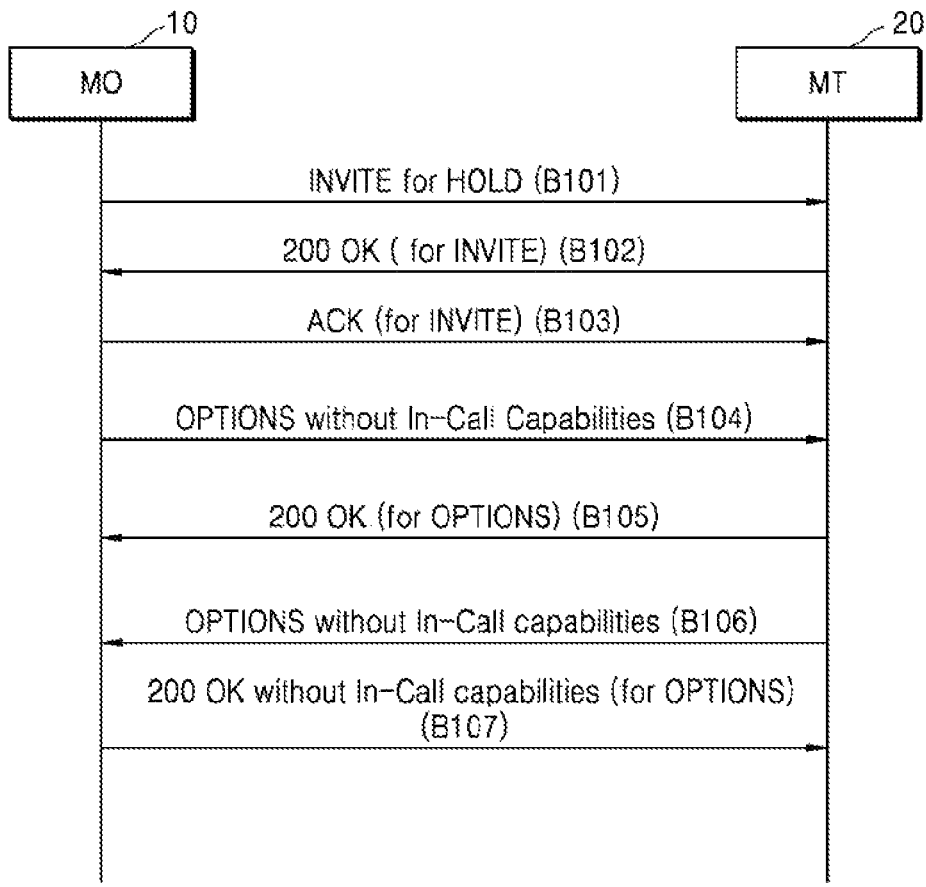
FIG. 1B is a sequential diagram illustrating signalling of the SIP messages between the MO and the MT for holding a call.

FIG. 1B is a sequential diagram illustrating signalling of the SIP messages between the MO 10 and the MT 20 for holding the connected call.

The MO 10 has to negotiate with the MT 20 to hold/resume a connected call. In operation B101, the MO 10 may send the call request message (i.e. INVITE message) to the MT 20 for connecting to the MT 20. In operation B102, the MT 20 may send the call response message (i.e. 200 OK message), in response to connecting to the MO 10.

In operation B103, the MO 10 may send the acknowledgment to the MT 20, in response to receiving the call response message. In operation B104, the MO 10 may send OPTIONS message to the MT 20, indicating that the MO 10 wants to hold the connected call, where the contact header of the OPTIONS message may not include the In-Call capability features of the MO 10.

In operation B105, the MT 20 may acknowledge with the 200 OK message to the MO 10, in response to receiving the OPTIONS message from the MO 10. In operation B106, the MT 20 may send OPTIONS message to the MO 10, indicating that the MO 10 is ready to hold the connected call, where the contact header of the OPTIONS message may not include the In-Call capability features of the MT 20.

In operation B107, the MO 10 may acknowledge with the 200 OK message to the MT 20, in response to receiving the OPTIONS message from the MT 20. Therefore, at least two OPTIONS messages are consumed for each connected call, to hold the call. Also, similar number of steps as mentioned for holding the call is required to resume the call.

Figure 2A:
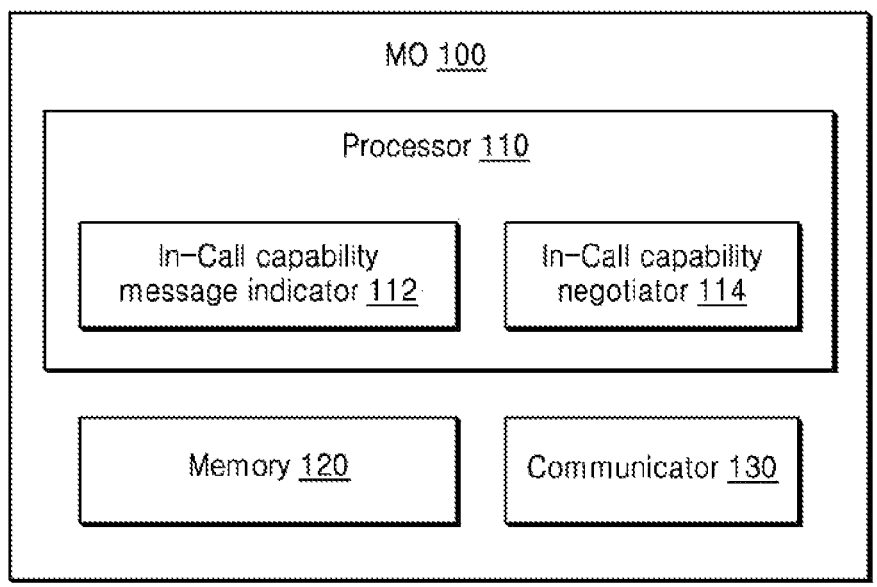
FIG. 2A is a block diagram of the MO for identifying the In-Call capability features without dedicated capability discovery procedure, according to an embodiment of the disclosure.

FIG. 2A is a block diagram of the MO 100 for identifying In-Call capability features without dedicated capability discovery procedure, according to an embodiment of the disclosure.

Examples for the MO 100 are, but not limited to a smart phone, a tablet computer, a personal computer, a personal digital assistance (PDA), an Internet of Things (IoT) or the like. In an embodiment, the MO 100 may include, but not limited to a processor 110, a memory 120 and a communicator 130. In an embodiment, the processor 110 may include an In-Call capability message indicator 112 and an In-Call capability negotiator 114. The processor 110 may be coupled to the memory 120 and the communicator 130. The processor 110 may be configured to send a call request message to the MT 200. The call request message may include the In-Call capability features of the MO 100. That is, information regarding In-Call capability features of the MO may be included in the call request message.

In an embodiment, the call request message may a SIP INVITE message (also called as an INVITE message). An example for the SIP INVITE message based on proposed solution is given below, but not limited to thereon:

To:<sip:+918618796051@ims.mnc861.mcc405.3 gpp-network.org; user=phone>
From: <tel:+918618796032>; tag=82b79c35
CSeq: 1 INVITE
Session-Expires: 1800
Min-SE: 90
Contact: <sip:405861060003397@[2405:204:5e00:ced7::81b:30b0]: 5060>;
sip.instance="<urn:gsma:imei:35241909-031555 0>"; q=1.0; +g.3 gpp.icsi-ref="urn %3Aurn-7%3A3 gpp service.ims.icsi.mmtel,urn %3Aurn-7%3A3 gpp service.ims.icsi.gsma.callcomposer,urn %3Aurn-7%3A3 gpp-service.ims.icsi.gsma.sharedmap,urn %3Aurn-7%3A3 gpp-service.ims.icsi.gsma.sharedsketch,urn %3Aurn-7%3A3 gpp-service.ims.icsi.gsma.callunanswered"; video; +g.oma.sip-im; +g.3 gpp.smsip; +g.3 gpp.iari-ref="urn %3Aurn-7%3A3 gpp-application.ims.iari.rcse.im,urm %3Aurn-7%3A3 gpp-application.ims.iari.rcs.fullsfgroupchat,urn %3Aurn-7%3A3 gpp-application.ims.iari.rcse.ft,urn %3Aurn-7%3A3 gpp-application.ims.iari.rcs.fthttp,urn %3Aurn-7%3A3 gpp-application.ims.iari.rcs.ftthumb,urn %3Aurn-7%3A3 gpp-application.ims.iari.gsma-is,urn %3Aurn-7%3A3 gpp-application.ims.iari.joyn.intmsg,urn %3Aurn-7%3A3 gpp-application.ims.iari.rcs.geopush"
Accept: application/sdp
Allow: INVITE, ACK, OPTIONS, CANCEL, BYE, UPDATE, INFO, REFER, NOTIFY, MESSAGE, PRACK
Content-Type: multipart/mixed; boundary=ca2c5e7adb09165e
Supported: timer, sec-agree
User-Agent: Samsung_SM-G960F_G960FXXE1BRD3_IMS_6.0
P-Preferred-Identity: <tel:+918618796032>
Accept-Contact: *; +g.oma.sip-im In an embodiment. the processor 110 may send the call request message to the MT 200. The In-Call capability message indicator 112 may send the call request message to the MT 200. The processor 110 may be configured to receive a call response message from the MT 200. The call response message may include the In-Call capability features of the MT 200. In other words, information regarding In-Call capability features of the MT may be included in the call response message.

In an embodiment, the call response message may a SIP INVITE 200 OK message (also called as a 200 OK message). An example for the SIP INVITE 200 OK message based on the proposed solution is given below, but not limited to thereon:

Via: SIP/2.0/TCP [2405:204:5c89:419::172f:f0a0]: 6100; branch=z9hG4bK-524287-1—
Contact: <sip:20724442698782839-68330@ka1wcas0019rcs.ims.mnc861.mcc405.3 gppnetwork.org:5060; fid=server_1>; +si p.instance="<urn: gsma:imei:35241909-008267-0>"; +g.3 gpp.icsi-ref="urn %3Aurn-7%3A3 gpp-service.ims.icsi.mmtel, urn %3Aurn-7%3A3 gpp-service.ims.icsi.gsma.callcomposer,urn %3Aurn-7%3A3 gpp-service.ims.icsi.gsma.sharedmap,urn %3Aurn-7%3A3 gpp-service.ims.icsi.gsma.sharedsketch,urn %3Aurn-7%3A3 gpp-service.ims.icsi.gsma-.callunanswered"; +g.oma.sip-im; +g.3 gpp.smsip; +g.3 gpp.iari-ref="urn %3Aurn-7%3A3 gpp-application.ims.iari.rcse.im,urn %3Aurn-7%3A3 gpp-application.ims.iari.rcs.fullsfgroupchat,urn %3Aurn-7%3A3 gpp-application.ims.iari.rcse.ft,urn %3Aurn-7%3A3 gpp-application.ims.iari.rcs.fthttp,urn %3Aurn-7%3A3 gpp-application.ims.iari.rcs.ftthumb,urn %3Aurn-7%3A3 gpp-application.ims.iari.gsma-is,urn %3Aurn-7%3A3 gpp-application.ims.iari.joyn.intmsg,urn %3Aurn-7%3A3 gpp-application.ims.iari.rcs.geo-push"; video
To:<sip:+916361752915@ims.mnc861.mcc405.3 gpp-network.org; user=phone>; tag=jfs1 h7dv-4z613v
From: <tel:+916361752913>; tag=98956326
Call-ID: 0sDiHD7RI_Lzgwj-vzrizg.@2405:204:5c89:419::172f:f0a0
CSeq: 1 INVITE
Session-Expires: 1800; refresher=uac
Content-Type: application/sdp
Server: IM-serv/OMA1.0 WCAS
Content-Length: 442

In an embodiment. the processor 110 may receive the call response message from the MT 200. In an embodiment, the In-Call capability message indicator 112 may receive the call response message from the MT 200. The processor 110 may be configured to perform the In-Call capability negotiation with the MT 200. In an embodiment, the In-Call capability negotiator 114 may perform the In-Call capability negotiation with the MT 200.

In an embodiment, the MO 100 may indicate the In-Call capability features in a contact header of the call request message when the MO 100 supports a VOLTE(Voice Over Long Term Evolution) and a RCS(Rich Communication Suite) on a single PDN(Packet Data Network) and the MT 200 support the VOLTE and the RCS on a single PDN.

Furthermore, In an embodiment, the MO 100 may indicate the In-Call capability features in a SIP private extension header of the call request message when the MO 100 supports the VOLTE and the RCS on the single PDN, and the MT 200 supports the VOLTE on a first PDN and the RCS on a second PDN.

Furthermore, In an embodiment, the MO 100 may indicate the In-Call capability features in the SIP private extension header of the call request message when the MO 100 supports the VOLTE on the first PDN and the RCS on the second PDN, and the MT 200 supports the VOLTE and the RCS on the single PDN.

Additionally, In an embodiment, the MO 100 may indicate the In-Call capability features in the SIP private extension header of the call request message when the MO 100 supports the VOLTE on the first PDN and the RCS on the second PDN, and the MT 200 supports the VOLTE on the first PDN and the RCS on the second PDN.

*93 Additionally, In an embodiment, In-Call capability features of a device may be discovered based on a device registration type, where the device is the MO 100 or the MT 200. The type of device registration can be a single registration or a dual registration.

In an embodiment, in the single registration, the VOLTE and the RCS may be registered on a single PDN for a same International Mobile Subscriber Identity (IMSI) or Mobile Subscriber Integrated Services Digital Network (MSISDN). In the dual registration, the VOLTE and the RCS may be registered on a different PDN for the same IMSI or MSISDN.

In an embodiment, when the MO 100 and the MT 200 have the single registration, then the In-Call capability features may negotiate in the contact header of the SIP INVITE message. In an embodiment, when the MO 100 has the single registration and the MT 200 has the dual registration, then the SIP INVITE message may include the SIP private extension header with the In-Call capability features. In an embodiment, when the MO 100 and the MT 200 have the dual registration, then the SIP INVITE message may include the SIP private extension header with the In-Call capability features.

In an embodiment, the MO 100 may generate the SIP private extension header for identifying the In-Call capability features in the dual registration. The SIP private extension header may include all the In-Call capability features supporting by the MO 100. Further, the MO 100 may add the SIP private extension header in the SIP INVITE message to convey the MT 200 that the MO 100 is RCS registered and supports in the In-Call capability features. If the MT 200 is registered to the RCS, then the MT 200 may parse the SIP private extension header and may add the In-Call capability features of the MT 200 in the same SIP private extension header. Further, the MT 200 may reply the SIP INVITE 200 OK message including the updated SIP private extension header. Further, the device may activate the In-Call capability features based on the request/response for the In-Call capability features.

In an embodiment, the SIP private extension header may be defined as P-Associated-Features. Consider the device may be registered to the RCS & In-Call capability features. While initiating the call, the MO 100 may send the SIP INVITE message to the MT 200 by adding the SIP private extension header "P-Associated-Features" with all the supported "In-Call capability features". An example for the SIP INVITE message is given below, but not limited to thereon:

[—>] INVITE <sip:+918618796078@ims.mnc861.mcc405.3gppnetwork.org>SIP/2.0 [CSeq: 1 INVITE]
Via: SIP/2.0/TCP [2405:204:5c1d:b1a2::b9c:70a4]:6300; branch=z9hG4bK-524287-1—2be20f84ddae419c; rport; transport=TCP
Max-Forwards: 70
Route: <sip:[2405:200:370:1581::33]:5067; lr>
Proxy-Require: sec-agree
Require: sec-agree
Contact:<sip:+918618796078@[2405:204:5c1d:b1a2::b9c:70a4]: 6300>; +sip.instance="<urn:gsma:imei:35202309-002471-0>"; +g.3 gpp.icsi-ref="urn %3Aurn-7%3A3 gpp-service.ims.icsi.mmtel"; video
P-Associated-Features: +g.3 gpp.icsi-ref="urn %3Aurn-7%3A3 gpp-service.ims.icsi.gsma.sharedmap,urn %3Aurn-7%3A3 gpp-service.ims.icsi.gsma.sharedsketch,urn %3Aurn-7%3A3 gpp-service.ims.icsi.gsma.callunanswered"

The MT 200 checks the SIP private extension header and returns "In-Call capability features" of the MT 200 in the SIP INVITE 200 OK message. Along with a session negotiation, the In-Call capability negotiation will also be carried out. An example for the SIP INVITE 200 OK message is given below:

<—200 OK INVITE <sip:+918618796078@ims.mnc861.mcc405.3gppnetwork.org>SIP/2.0 [CSeq: 1 INVITE]
Via: SIP/2.0/TCP
[2405:204:5c1d:b1a2::b9c:70a4]:6300; branch=z9hG4bK-524287-1—2be20f84ddae419c; rport; transport=TCP
Max-Forwards: 70
Route: <sip:[2405:200:370:1581::33]:5067; lr>
Proxy-Require: sec-agree
Require: sec-agree
Contact: <sip:+918618796078@[2405:204:5c1d:b1a2::b9c:70a4]: 6300>; +sip.instance=" <urn:gsma:imei:35202309-002471-0>"; +g.3 gpp.icsi-ref="urn %3Aurn-7%3A3 gpp-service.ims.icsi.mmtel"; video
P-Associated-Features: +g.3 gpp.icsi-ref="urn %3Aurn-7%3A3 gpp-service.ims.icsi.gsma.sharedmap,urn %3Aurn-7%3A3 gpp-service.ims.icsi.gsma.sharedsketch,urn %3Aurn-7%3A3 gpp-service.ims.icsi.gsma.callunanswered"

The processor 110 may be configured to execute instructions stored in the memory 120. The memory 120 may include non-volatile storage elements. Examples of such non-volatile storage elements may include magnetic hard discs, optical discs, floppy discs, flash memories, or forms of an Electrically Programmable Memory(EPROM) or an Electrically Erasable and Programmable Memory(EEPROM).

In addition, the memory 120 may be considered a non-transitory storage medium. The term 'non-transitory' may indicate that the storage medium is not embodied in a carrier wave or a propagated signal. However, the term 'non-transitory' should not be interpreted that the memory 120 is non-movable.

In an embodiment, the memory 120 can be configured to store larger amounts of information than the memory 120.

For example, a non-transitory storage medium may store data that can, over time, change (e.g., in Random Access Memory (RAM) or cache), but not limited to thereon.

The communicator 130 may be configured to communicate internally between hardware components in the MO 100. Further, the communicator 130 may be configured to communicate the MO 100 to the MT 200.

In an embodiment, the identification of the In-Call capability features without dedicated capability discovery procedure may be used in a SUBSCRIBE, PUBLISH, AND NOTIFY network, a network that supports OPTIONS way of capability exchange and a hybrid network.

In an embodiment, the MO 100 supports the SUBSCRIBE, PUBLISH, AND NOTIFY way of dedicated capability discovery procedure and the MT 200 supports OPTIONS way of dedicated capability discovery procedure and vice versa, in hybrid networks.

Although the FIG. 2A shows the hardware components of the MO 100 but it is to be understood that other embodiments are not limited thereon. In an embodiment, the MO 100 may include less or more number of components. Further, the labels or names of the components are used only for illustrative purpose and does not limit the scope of the invention. One or more components can be combined together to perform same or substantially similar function for identifying the In-Call capability features without dedicated capability discovery procedure.

Figure 2B:
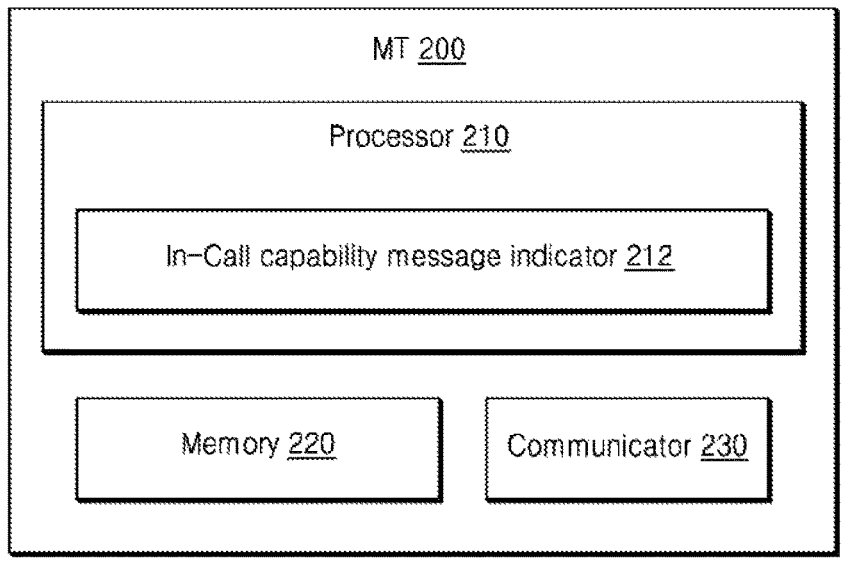
FIG. 2B is a block diagram of the MT for identifying the In-Call capability features without dedicated capability discovery procedure, according to an embodiment of the disclosure.

FIG. 2B is a block diagram of the MT 200 for identifying the In-Call capability features without dedicated capability discovery procedure, according to an embodiment of the disclosure.

Examples for the MT 100 are, but not limited to a smart phone, a tablet computer, a personal computer, a personal digital assistance (PDA), an Internet of Things (IoT) or the like. In an embodiment, the MT 200 may include, but not limited to a processor 210, a memory 220 and a communicator 230. In an embodiment, the processor 210 may include an In-Call capability message indicator 212.

In an embodiment, the processor 210 may be configured to receive the call request message from the MO 100. The In-Call capability message indicator 212 may receive the call request message from the MO 100. The processor 210 may be configured to determine whether the MT 200 is a VOLTE device or a non-VOLTE device.

In an embodiment, determining whether the MT is the VOLTE device or the non-VOLTE device may include determining whether the In-Call capability features of the MO 100 is indicated in the contact header of the call request message. That is, information regarding In-Call capability features of the MO may be included in the contact header of the call request message.

Further, determining whether the MT is the VOLTE device or the non-VOLTE device may include determining whether the In-Call capability features of the MO 100 is indicated in the SIP private extension header of the call request message, in response to determining that the In-Call capability features of the MO is not indicated in the contact header of the call request message. That is, information regarding In-Call capability features of the MO may be included in the SIP private extension header of the call request message.

In an embodiment, the processor 210 may determines whether the MT 200 is the VOLTE device or non-VOLTE device. The In-Call capability message indicator 212 may determine whether the MT 200 is the VOLTE device or the non-VOLTE device.

In an embodiment, the processor 210 may be configured to send the call response message including the In-Call capability features of the MT 200 to the MO 100, in response to determining that the MT 200 is the VOLTE device. In an embodiment, the In-Call capability message indicator 212 may send the call response message to the MO 100, in response to determining that the MT 200 is the VOLTE device.

In an embodiment, the processor 210 may be configured to follow a legacy capability exchange including the In-Call capability features, in response to determining that the MT 200 is the non-VOLTE device. That is, the processor 210 may perform a legacy capability exchange for exchanging the information regarding In-Call capability features, when the MT is a non-VOLTE device.

In an embodiment, The In-Call capability message indicator 212 may follow the legacy capability exchange including the In-Call capability features, in response to determining that the MT 200 is the non-VOLTE device.

In an embodiment, the MT 200 may refer the contact header to know whether the MO 100 supports the In-Call capability features. If the In-Call capability features are not present in the contact header then the MT 200 may check the SIP private extension header. In an embodiment, when the MT 200 is the VOLTE device and does not support In-Call capability features, then the MT 200 may mark the SIP private extension header with value "none" and may send to the MO 100 for avoiding falling back to legacy mode.

In an embodiment, the processor 210 may be configured to execute instructions stored in the memory 220. The memory 220 may include non-volatile storage elements. Examples of such non-volatile storage elements may include magnetic hard discs, optical discs, floppy discs, flash memories, or forms of an Electrically Programmable Memory (EPROM) or an Electrically Erasable and Programmable Memory(EEPROM).

In addition, the memory 220 may be considered a non-transitory storage medium. The term 'non-transitory' may indicate that the storage medium is not embodied in a carrier wave or a propagated signal. However, the term 'non-transitory' should not be interpreted that the memory 220 is non-movable.

In an embodiment, the memory 220 can be configured to store larger amounts of information than the memory 220. In For example, a non-transitory storage medium may store data that can, over time, change (e.g., in Random Access Memory (RAM) or cache), but not limited to thereon.

The communicator 230 may be configured to communicate internally between hardware components in the MT 200. Further, the communicator 230 may be configured to communicate the MT 200 to the MO 100.

Although the FIG. 2B shows the hardware components of the MT 200 but it is to be understood that other embodiments are not limited thereon. In an embodiment, the MT 200 may include less or more number of components. Further, the labels or names of the components are used only for illustrative purpose and does not limit the scope of the invention. One or more components can be combined together to perform same or substantially similar function for identifying the In-Call capability features without dedicated capability discovery procedure.

Figure 3:
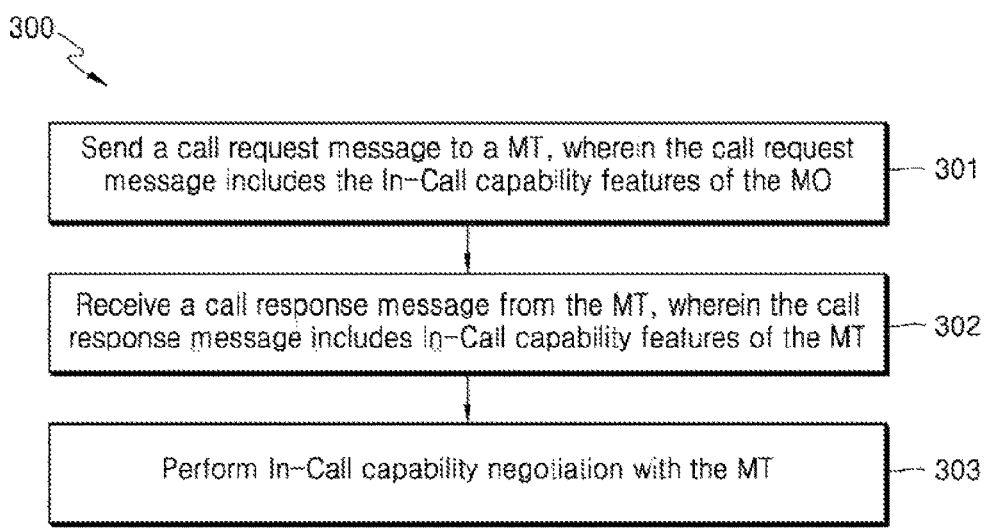
FIG. 3 is a flow diagram illustrating a method for identifying the In-Call capability features without dedicated capability discovery procedure by the MO, according to an embodiment of the disclosure.

FIG. 3 is a flow diagram 300 illustrating a method for identifying the In-Call capability features without dedicated capability discovery procedure by the MO 100, according to an embodiment of the disclosure.

In operation 301, the method may include sending the call request message to the MT 200, wherein the call request message may include the In-Call capability features of the MO 100. In an embodiment, the method may allow the In-Call capability message indicator 112 to send the call request message to the MT 200, wherein the call request message may include the In-Call capability features of the MO 100.

In operation 302, the method may include receiving the call response message from the MT 200, wherein the call response message may include the In-Call capability features of the MT 200. In an embodiment, the method may allow the In-Call capability message indicator 112 to receive the call response message from the MT 200, where the call response message may include the In-Call capability features of the MT 200.

In operation 303, the method may include performing the In-Call capability negotiation with the MT 200. In an embodiment, the method may allow the In-Call capability negotiator 114 to perform the In-Call capability negotiation with the MT 200.

The various actions, acts, blocks, steps, or the like in the flow diagram 300 may be performed in the order presented, in a different order or simultaneously. Further, in some embodiments, some of the actions, acts, blocks, steps, or the like listed in FIG. 3 may be omitted, added, modified, skipped, or the like without departing from the scope of the invention.

Figure 4:
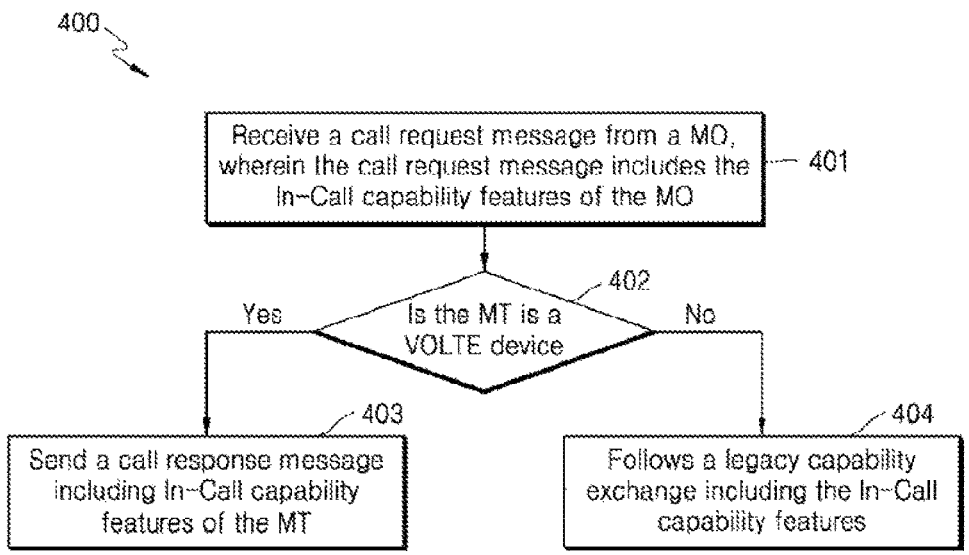
FIG. 4 is a flow diagram illustrating a method for identifying In-Call capability features without dedicated capability discovery procedure by the MT, according to an embodiment of the disclosure.

FIG. 4 is a flow diagram 400 illustrating a method for identifying the In-Call capability features without dedicated capability discovery procedure by the MT 200, according to an embodiment of the disclosure.

In operation 401, the method may include receiving the call request message from the MO 100, wherein the call request message may include the In-Call capability features of the MO 100. In an embodiment, the method may allow the In-Call capability message indicator 212 to receive the call request message from the MO 100, where the call request message may include the In-Call capability features of the MO 100.

In operation 402, the method may include determining whether the MT 200 is one of the VOLTE device and the non-VOLTE device. In an embodiment, the method may allow the In-Call capability message indicator 212 to determine whether the MT 200 is one of the VOLTE device and the non-VOLTE device.

In operation 403, the method may include sending the call response message including the In-Call capability features of the MT 200 to the MO 100, in response to determining that the MT 200 is the VOLTE device. In an embodiment, the method may allow the In-Call capability message indicator 212 to send the call response message including the In-Call capability features of the MT 200 to the MO 100, in response to determining that the MT 200 is the VOLTE device.

In operation 404, the method may include following the legacy capability exchange including the In-Call capability features, in response to determining that the MT 200 is the non-VOLTE device. In an embodiment, the method may allow the In-Call capability message indicator 212 to follow the legacy capability exchange including the In-Call capability features, in response to determining that the MT 200 is the non-VOLTE device.

The various actions, acts, blocks, steps, or the like in the flow diagram 400 may be performed in the order presented, in a different order or simultaneously. Further, in some embodiments, some of the actions, acts, blocks, steps, or the like listed in FIG. 4 may be omitted, added, modified, skipped, or the like without departing from the scope of the invention.

Figure 5:
FIG. 5 is a sequential diagram illustrating signalling of the SIP messages between the MO and the MT to identify the In-Call capability features without dedicated capability discovery procedure, according to an embodiment of the disclosure.

FIG. 5 is a sequential diagram illustrating signalling of the SIP messages between the MO 100 and the MT 200 to identify the In-Call capability features without dedicated capability discovery procedure, according to an embodiment of the disclosure.

In operation 501, the MO 100 may send the INVITE message to the MT 200 for connecting to the MT 200 and indicating the In-Call capability features of the MO 100. The contact header and the SIP private extension header of the INVITE message may include the In-Call capability features.

In operation 502, the MT 200 may send the 200 OK message to the MO 100 for acknowledging the received INVITE message and indicating the In-Call capability features of the MT 200. The contact header and the SIP private extension header of the 200 OK message may include the In-Call capability features of the MT 200.

In operation 503, the MO may to send acknowledge to the MT, in response to receiving the 200 OK message.

Figure 6:
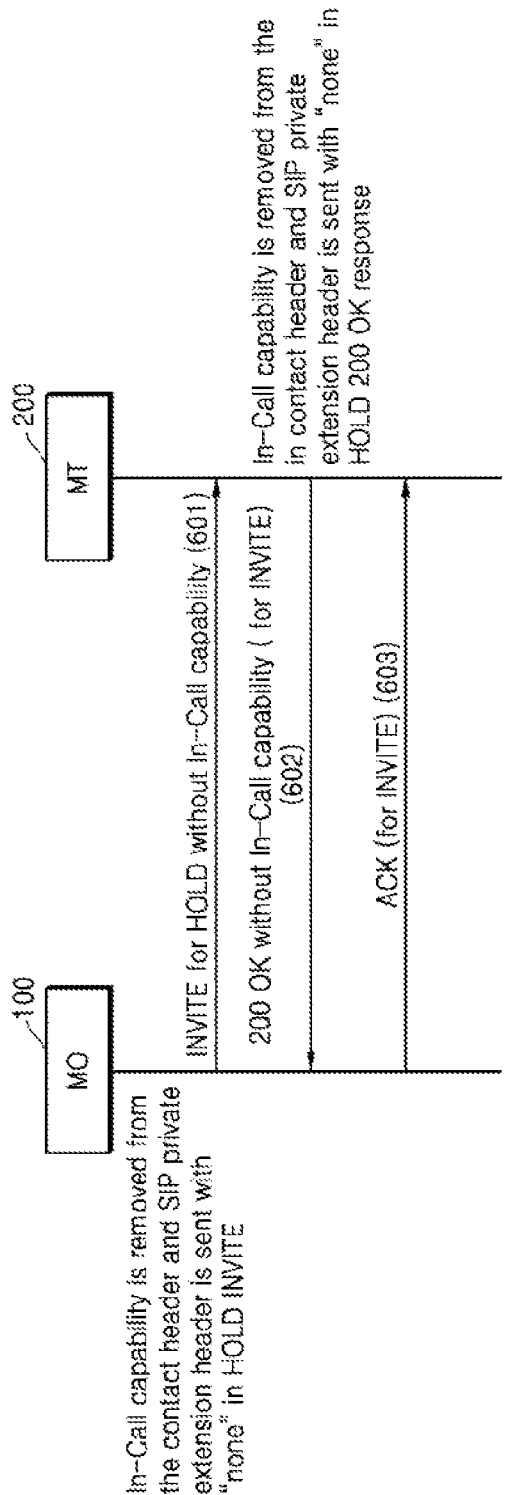
FIG. 6 is a sequential diagram illustrating signalling of the SIP messages between the MO and the MT for holding the call, according to an embodiment of the disclosure.

FIG. 6 is a sequential diagram illustrating signalling of the SIP messages between the MO 100 and MT 200 for holding a call during a call session, according to an embodiment of the disclosure.

Consider, the MO 100 is connected to the MT 200 for a call session. The MO 100 may remove the In-Call capability features in the contact header and the SIP private extension header of the INVITE message and may mark as 'none'.

In operation 601, the MO 100 may send the INVITE message to the MT 200 for holding the call. In response to receiving the INVITE message, the MT 200 may remove the In-Call capability features in the contact header and the SIP private extension header of the 200 OK message and may mark as 'none'.

In operation 602, the MT 200 may send the 200 OK message to the MO 100, indicating that the MT 100 is ready to hold the call.

In operation 603, the MO 100 may to send acknowledge to the MT 200 and holds the call, in response to receiving the 200 OK message. Similarly, the call on hold can be resume by signalling between the MO 100 and MT 200 based on the proposed method.

The embodiments disclosed herein can be implemented using at least one software program running on at least one hardware device and performing network management functions to control the elements. The elements shown in FIGS. 2A and 2B can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method performed by a mobile originated (MO) device in a wireless communication system, the method comprising:
transmitting, to a mobile terminated (MT) device, a session initiation protocol (SIP) INVITE request message including information regarding in-call capability features of the MO device,
wherein the information regarding in-call capability features of the MO device is included in a contact header of the SIP INVITE request message in a single registration,
wherein the information regarding in-call capability features of the MO device is included in a SIP private extension header of the SIP INVITE request message in a dual registration,
wherein in the single registration, a Voice Over Long Term Evolution (VOLTE) and a Rich Communication Service (RCS) are registered on a single Packet Data Network (PDN) for a same International Mobile Subscriber Identity (IMSI) or Mobile Subscriber Integrated Services Digital Network (MSISDN), and
wherein in the dual registration, the VOLTE and the RCS are registered on a different PDN for the same IMSI or MSISDN;
in response to the SIP INVITE request message, receiving, from the MT device, a response message including information regarding in-call capability features of the MT device,
wherein receiving the response message including the information regarding in-call capability features of the MT device is performed based on a determination whether the MT device is the VOLTE device or not, and
wherein the determination whether the MT device is the VOLTE device or not comprises a determination whether the information regarding in-call capability features of the MO device is indicated in the contact header or the SIP private extension header of the SIP INVITE request message; and
performing in-call capability negotiation with the MT device.

2. The method of claim 1,
wherein information regarding in-call capability features of the MO device indicates the MO device supports sharing content with the MT device, and
wherein the information regarding in-call capability features of the MT device indicates the MT device supports sharing content with the MO device.

3. The method of claim 1, further comprising:
transmitting, to the MT device, an INVITE message for holding a call,
wherein the INVITE message for holding the call comprises the contact header and the SIP private extension header marked as none;
receiving, from the MT device, a 200 OK message indicating that the MT device is ready to hold the call, wherein the 200 OK message comprises the contact header and the SIP private extension header marked as none; and
in response to the 200 OK message, transmitting, to the MT device, an acknowledge message.

4. The method of claim 1, further comprising:
in response to the response message, transmitting, to the MT device, an acknowledge message.

5. A method performed by a mobile terminated (MT) device in a wireless communication system, the method comprising:
receiving, from a mobile originated (MO) device, a session initiation protocol (SIP) INVITE request message including information regarding in-call capability features of the MO device,
wherein the information regarding in-call capability features of the MO device is included in a contact header of the SIP INVITE request message in a single registration,
wherein the information regarding in-call capability features of the MO device is included in a SIP private extension header of the SIP INVITE request message in a dual registration,
wherein in the single registration, a Voice Over Long Term Evolution (VOLTE) and a Rich Communication Service (RCS) are registered on a single Packet Data Network (PDN) for a same International Mobile Subscriber Identity (IMSI) or Mobile Subscriber Integrated Services Digital Network (MSISDN), and
wherein in the dual registration, the VOLTE and the RCS are registered on a different PDN for the same IMSI or MSISDN; and
in response to the SIP INVITE request message, transmitting, to the first MO device, a response message including information regarding in-call capability features of the MT device,
wherein receiving the response message including the information regarding in-call capability features of the MT device is performed based on a determination whether the MT device is the VOLTE device or not,
wherein the determination whether the MT device is the VOLTE device or not comprises a determination whether the information regarding in-call capability features of the MO device is indicated in the contact header or the SIP private extension header of the SIP INVITE request message; and
performing in-call capability negotiation with the MO device.

6. The method of claim 5,
wherein the information regarding in-call capability features of the MO device indicates the MO device supports sharing content with the MT device, and
wherein the information regarding in-call capability features of the MT device indicates the MT device supports sharing content with the MO device.

7. The method of claim 5, further comprising:
receiving, from the MO device, an INVITE message for holding a call,
wherein the INVITE message for holding the call comprises the contact header and the SIP private extension header marked as none;
transmitting, to the MO device, a 200 OK message indicating that the MT device is ready to hold the call,
wherein the 200 OK message comprises the contact header and the SIP private extension header marked as none; and
in response to the 200 OK message, receiving, from the MO device, an acknowledge message.

8. The method of claim 5, further comprising:
in response to the response message, receiving, from the MO device, an acknowledge message.

9. A mobile originated (MO) device performed in a wireless communication system, the MO device comprising:
a transceiver; and
at least one processor coupled to the transceiver and configured to:

transmit, to a mobile terminated (MT) device, a session initiation protocol (SIP) INVITE request message including information regarding in-call capability features of the MO device, wherein the information regarding in-call capability features of the MO device is included in a contact header of the SIP INVITE request message in a single registration, wherein the information regarding in-call capability features of the MO device is included in a SIP private extension header of the SIP INVITE request message in a dual registration, wherein in the single registration, a Voice Over Long Term Evolution (VOLTE) and a Rich Communication Service (RCS) are registered on a single Packet Data Network (PDN) for a same International Mobile Subscriber Identity (IMSI) or Mobile Subscriber Integrated Services Digital Network (MSISDN), and wherein in the dual registration, the VOLTE and the RCS are registered on a different PDN for the same IMSI or MSISDN, in response to the SIP INVITE request message, receive, from the MT device, a response message including information regarding in-call capability features of the MT device, wherein receiving the response message including the information regarding in-call capability features of the MT device is performed based on a determination whether the MT device is the VOLTE device or not, wherein the determination whether the MT device is the VOLTE device or not comprises a determination whether the information regarding in-call capability features of the MO device is indicated in the contact header or the SIP private extension header of the SIP INVITE request message, and perform in-call capability negotiation with the MT device.

10. The MO device of claim 9,
wherein the information regarding in-call capability features of the MO device indicates the MO device supports sharing content with the MT device, and
wherein the information regarding in-call capability features of the MT device indicates the MT device supports sharing content with the MO device.

11. The MO device of claim 9, wherein the at least one processor is further configured to:
transmit, to the MT device, an INVITE message for holding a call,
wherein the INVITE message for holding the call comprises the contact header and the SIP private extension header marked as none,
receive, from the MT device, a 200 OK message indicating that the MT device is ready to hold the call,
wherein the 200 OK message comprises the contact header and the SIP private extension header marked as none, and
in response to the 200 OK message, transmit, to the MT device, an acknowledge message.

12. The MO device of claim 9, wherein the at least one processor is further configured to:
in response to the response message, transmit, to the MT device, an acknowledge message.

13. A mobile terminated (MT) device performed in a wireless communication system, the MT device comprising:

a transceiver; and
at least one processor coupled to the transceiver and configured to:
receive, from a mobile originated (MO) device, a session initiation protocol (SIP) INVITE request message including information regarding in-call capability features of the MO device, wherein the information regarding in-call capability features of the MO device is included in a contact header of the SIP INVITE request message in a single registration, wherein the information regarding in-call capability features of the MO device is included in a SIP private extension header of the SIP INVITE request message in a dual registration, wherein in the single registration, a Voice Over Long Term Evolution (VOLTE) and a Rich Communication Service (RCS) are registered on a single Packet Data Network (PDN) for a same International Mobile Subscriber Identity (IMSI) or Mobile Subscriber Integrated Services Digital Network (MSISDN), and wherein in the dual registration, the VOLTE and the RCS are registered on a different PDN for the same IMSI or MSISDN, and in response to the SIP INVITE request message, transmit, to the MO device, a response message including information regarding in-call capability features of the MT device, wherein receiving the response message including the information regarding in-call capability features of the MT device is performed based on a determination whether the MT device is the VOLTE device or not, wherein the determination whether the MT device is the VOLTE device or not comprises a determination whether the information regarding in-call capability features of the MO device is indicated in the contact header or the SIP private extension header of the SIP INVITE request message, and perform in-call capability negotiation with the MO device.

14. The MT device of claim 13,
wherein the information regarding in-call capability features of the MO device indicates the MO device supports sharing content with the MT device, and
wherein the information regarding in-call capability features of the MT device indicates the MT device supports sharing content with the MO device.

15. The MT device of claim 13, wherein the at least one processor is further configured to:
receive, from the MO device, an INVITE message for holding a call,
wherein the INVITE message for holding the call comprises the contact header and the SIP private extension header marked as none,
transmit, to the MO device, a 200 OK message indicating that the MT device is ready to hold the call,
wherein the 200 OK message comprises the contact header and the SIP private extension header marked as none, and
in response to the 200 OK message, receive, from the MO device, an acknowledge message.

16. The MT device of claim 13, wherein the at least one processor is further configured to:
in response to the response message, receive, from the MO device, an acknowledge message.

* * * * *